United States Patent
Fan et al.

(10) Patent No.: US 12,481,085 B2
(45) Date of Patent: Nov. 25, 2025

(54) STACKED MULTI-FREQUENCY THREE-DIMENSIONAL METASURFACE

(71) Applicant: Toyota Motor Engineering & Manufacturing North America, Inc., Plano, TX (US)

(72) Inventors: Shanhui Fan, Stanford, CA (US); Ercan Mehmet Dede, Ann Arbor, MI (US); Sean P. Rodrigues, Ann Arbor, MI (US); Haiwen Wang, Stanford, CA (US)

(73) Assignees: Toyota Motor Engineering & Manufacturing North America, Inc., Plano, TX (US); The Board of Trustees of the Leland Stanford Junior University, Stanford, CA (US)

( * ) Notice: Subject to any disclaimer, the term of this patent is extended or adjusted under 35 U.S.C. 154(b) by 832 days.

(21) Appl. No.: 17/716,441

(22) Filed: Apr. 8, 2022

(65) Prior Publication Data

US 2023/0324582 A1  Oct. 12, 2023

(51) Int. Cl.
*G02B 1/00* (2006.01)
*G02B 5/30* (2006.01)

(52) U.S. Cl.
CPC .......... *G02B 1/002* (2013.01); *G02B 5/3025* (2013.01)

(58) Field of Classification Search
CPC ............ G02B 1/002; G02B 5/3025; G02B 2207/101; G02B 5/1809; G02B 27/0081; G02B 1/007; G02B 1/005
See application file for complete search history.

(56) References Cited

U.S. PATENT DOCUMENTS

| | | | |
|---|---|---|---|
| 2010/0277791 A1* | 11/2010 | Bratkovski | G02B 27/48 359/279 |
| 2012/0280761 A1* | 11/2012 | Liu | H05K 1/025 333/32 |
| 2017/0356843 A1 | 12/2017 | Alu et al. | |
| 2018/0128953 A1* | 5/2018 | Ouyang | G02B 5/3041 |
| 2019/0383969 A1* | 12/2019 | Badano | G02B 1/002 |
| 2020/0014464 A1* | 1/2020 | Shrekenhamer | G02B 5/286 |
| 2020/0284960 A1 | 9/2020 | Ellenbogen et al. | |
| 2022/0187677 A1* | 6/2022 | Won | G02F 1/294 |

(Continued)

OTHER PUBLICATIONS

Ding et al., "Dual-Wavelength Terahertz Metasurfaces with Independent Phase and Amplitude Control at Each Wavelength," Scientific Reports, vol. 6, No. 34020, 2016, pp. 1-9.

(Continued)

*Primary Examiner* — Pinping Sun
*Assistant Examiner* — Matthew Y Lee
(74) *Attorney, Agent, or Firm* — Christopher G. Darrow; DARROW MUSTAFA PC

(57) ABSTRACT

A stacked three-dimensional (3D) metasurface includes a first layer with a first kernel configured to apply a first convolution on a first frequency of an incident polarized light, and a second layer with a second kernel different than the first kernel. The second kernel is configured to apply a second convolution different than the first convolution on a second frequency of the incident polarized light and the second frequency is different than the first frequency such that the stack 3D metasurface provides at least two independent convolutions on the incident polarized light.

20 Claims, 8 Drawing Sheets

(56) References Cited

U.S. PATENT DOCUMENTS

2022/0229207 A1* 7/2022 Li ................ H01Q 15/0086
2023/0051113 A1* 2/2023 Li ..................... G02F 1/035
2023/0136247 A1* 5/2023 Yao ................. G02B 5/201
356/369

OTHER PUBLICATIONS

Hu et al., "Tailoring Light with Layered and Moire Metasurfaces," Trends in Chemistry, vol. 3, issue 5, 2021, pp. 342-358.
Sun et al., "Coding Metasurfaces and Applications," Metamaterials and Metasurfaces, 2018, 12 pages.
Budhu et al., "The Design of Dual Band Stacked Metasurfaces using Integral Equations," in IEEE Transactions on Antennas and Propagation, 2022, pp. 1-14.
Thiele et al., "3D printed stacked diffractive microlenses," Optics Express, vol. 27, issue 24, 2019, pp. 35621-35630.
Hu et al., "3D-Intergrated metasurfaces for full-colour holography," Light: Science & Applications, vol. 8, No. 86, 2019, pp. 1-9.
He et al., "Monolithic metasurface spatial differentiator enabled by asymmetric photonic spin-orbit interactions," Nanophotonics, vol. 10, issue 1, 2020, pp. 741-748.
Mansouree et al., "Multifunctional 2.5D metastructures enabled by adjoint optimization," Optica, vol. 7, issue 1, 2020, pp. 77-84.

* cited by examiner

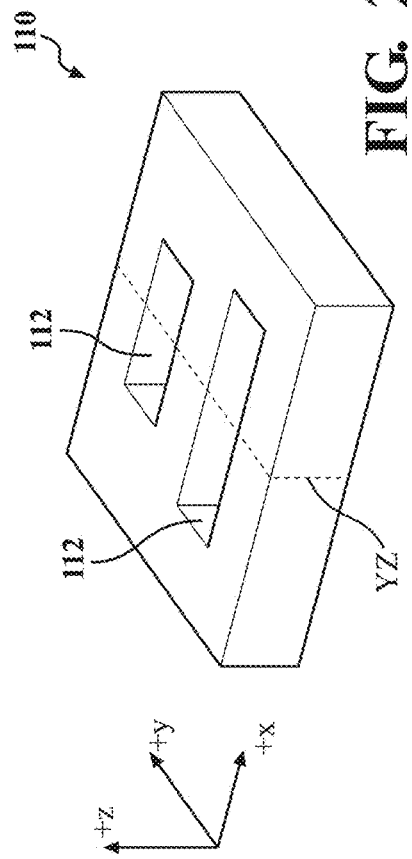
FIG. 2A
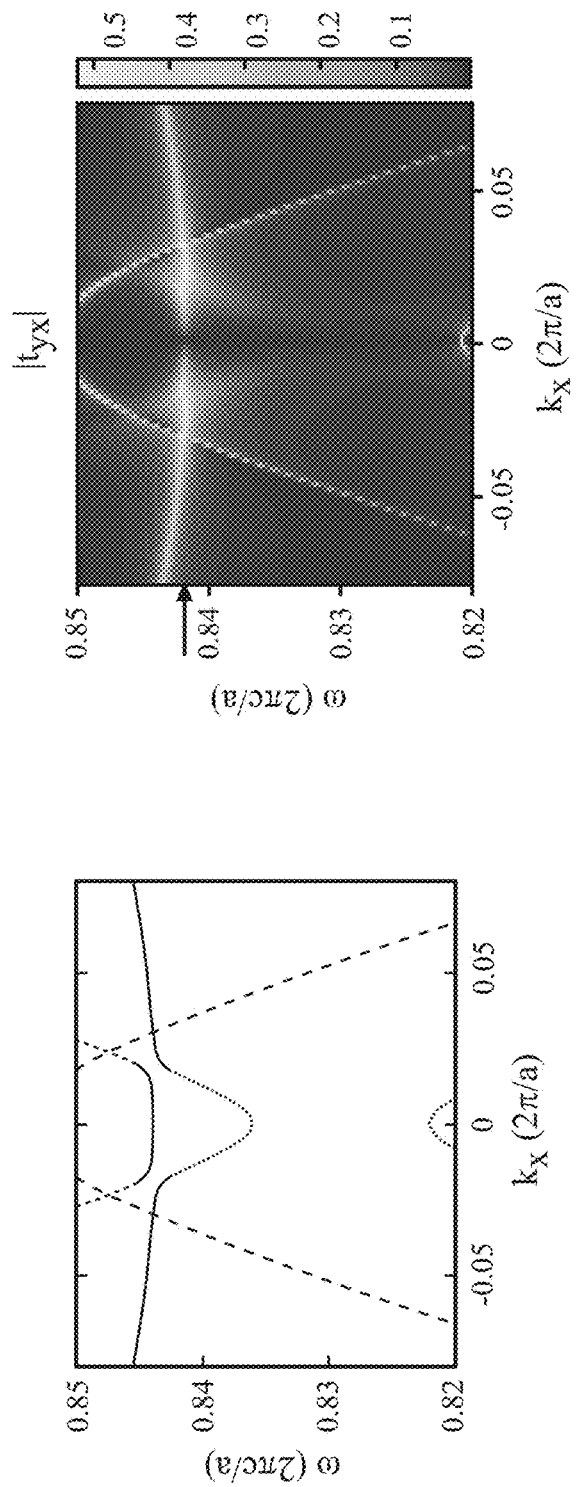
FIG. 2C
FIG. 2B

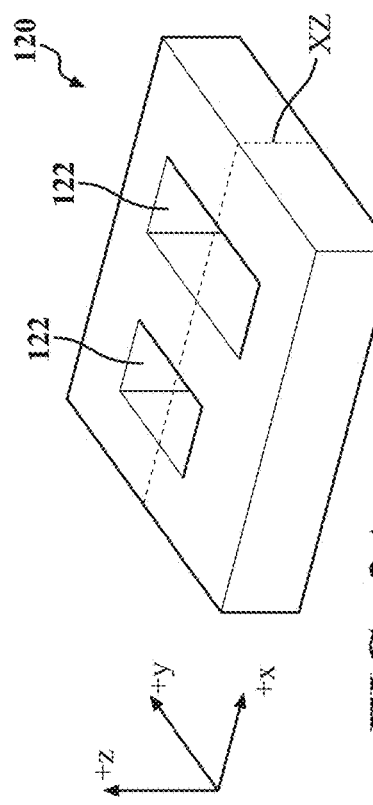
FIG. 3A
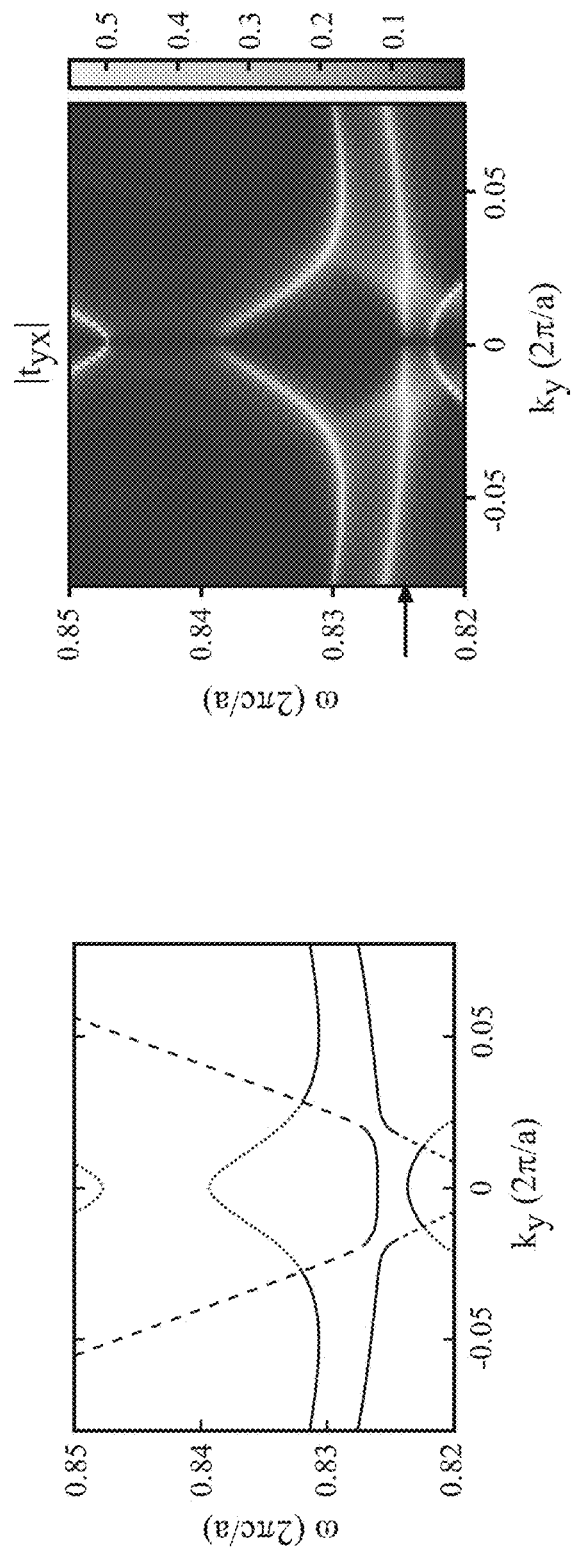
FIG. 3C
FIG. 3B

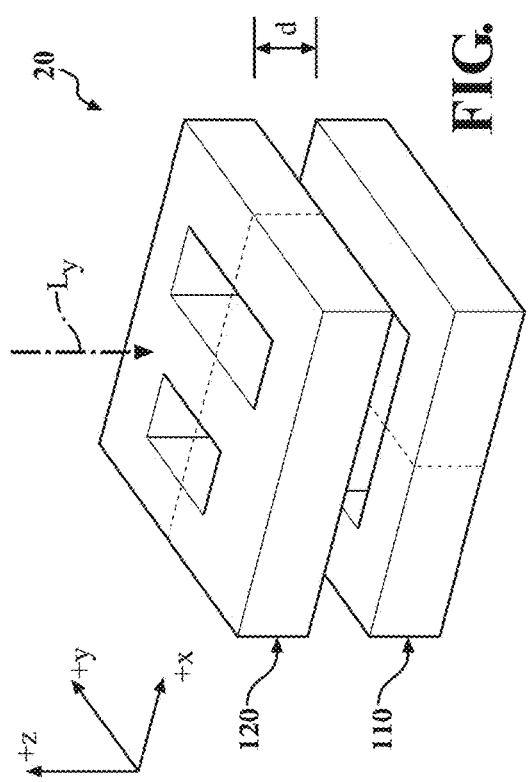
FIG. 4A
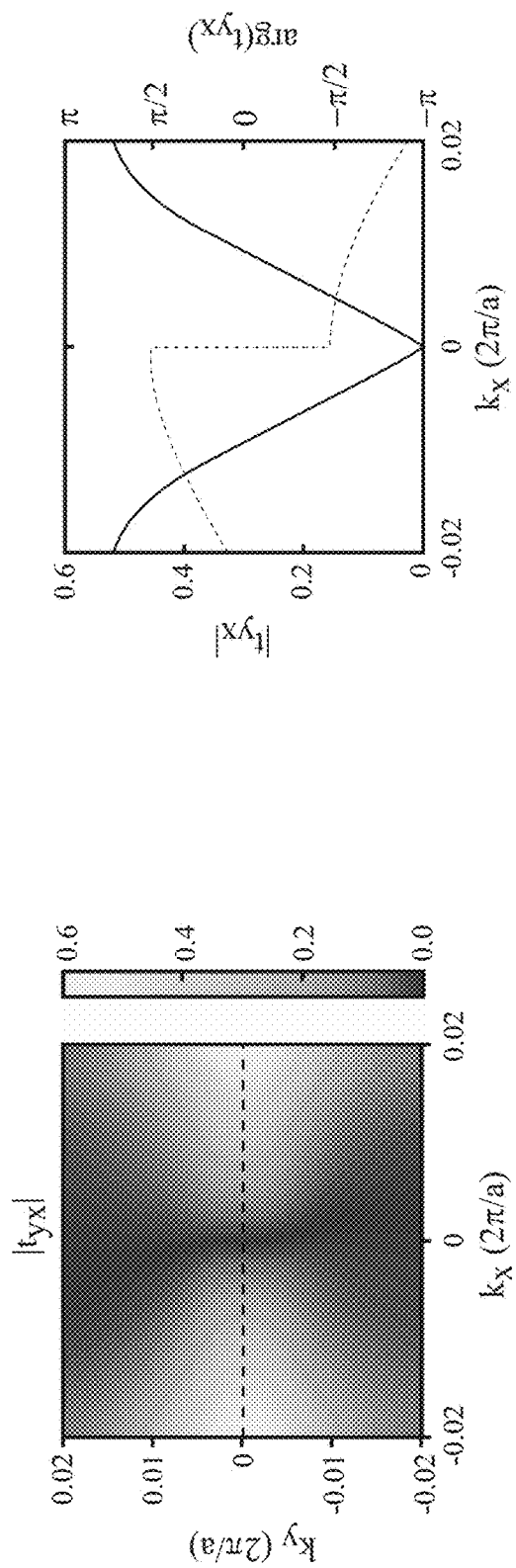
FIG. 4B
FIG. 4C

US 12,481,085 B2

STACKED MULTI-FREQUENCY THREE-DIMENSIONAL METASURFACE

TECHNICAL FIELD

The present disclosure generally relates to metamaterials and, more particularly, to metasurfaces.

BACKGROUND

Metamaterials are typically constructed from nano scale three-dimensional (3D) periodic subwavelength metallic or dielectric structures that resonantly couple to electric and magnetic fields of incident electromagnetic waves. However, fabrication of such nanoscale 3D structures can be time and cost intensive.

Metasurfaces, also known as two-dimensional (2D) metamaterials, can be easier to fabricate than metamaterials and have been used for the manufacture of optical elements and systems that surpass the performance of conventional diffractive optical elements. And while metasurfaces have been used to perform convolution operations on coherent light, convolution operations on multiwavelength light have yet to be achieved.

The present disclosure addresses the issues of performing convolution operations on multiwavelength light with a metasurface, among other issues related to convolution operations using metasurfaces.

SUMMARY

This section provides a general summary of the disclosure, and is not a comprehensive disclosure of its full scope or all of its features.

In one form of the present disclosure, a metasurface includes a multi-level three-dimensional metasurface with a first layer comprising a first kernel configured to apply a first convolution on a first frequency of an incident polarized light, and a second layer comprising a second kernel different than the first kernel. The second kernel is configured to apply a second convolution different than the first convolution on a second frequency different of the incident polarized light and the second frequency is different than the first frequency.

In another form of the present disclosure, a metasurface includes a multi-level three-dimensional metasurface with a first layer disposed on and parallel to a first plane and comprising a first kernel configured to apply a first convolution on a first frequency of an incident polarized light, and a second layer disposed on and parallel to a second plane that is parallel to and different from the first plane such that the second layer is stacked on the first layer. The second layer includes a second kernel different than the first kernel and the second kernel is configured to apply a second convolution different than the first convolution on a second frequency different than the first frequency of the incident polarized light.

In still another form of the present disclosure, a metasurface includes a multi-level three-dimensional metasurface with a first layer disposed on and parallel to a first plane and a second layer disposed on and parallel to a second plane that is parallel to and different from the first plane. The first layer includes a first kernel configured to apply a first convolution on a first frequency of an incident polarized light and the second layer includes a second kernel different than the first kernel. The second kernel is configured to apply a second convolution different than the first convolution on a second frequency different than the first frequency of the incident polarized light. Also, the first kernel is mirror symmetric along a first direction, the second kernel is mirror symmetric along a second direction perpendicular to the first direction, the first convolution is a first order differentiation of the first frequency of the incident polarized light, and the second convolution is another first order differentiation of the second frequency of the incident polarized light.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A is a perspective view of a first kernel for a stacked multi-frequency 3D metasurface according to the teachings of the present disclosure;

FIG. 2B is a plot showing the dispersion relation of the guided modes of the kernel in FIG. 2A;

FIG. 2C is a plot showing the absolute value of the complex transmission coefficients ($|t_{yx}|$) of y-polarized plane waves propagated through the kernel in FIG. 2A with x-polarized incident light;

FIG. 3A is a perspective view of a second kernel for a stacked multi-frequency 3D metasurface according to the teachings of the present disclosure;

FIG. 3B is a plot showing the dispersion relation of the guided modes of the kernel in FIG. 3A;

FIG. 3C is a plot showing the absolute value of the complex transmission coefficients ($|t_{yx}|$) of x-polarized plane waves propagated through the kernel in FIG. 3A;

FIG. 4A is a perspective view of the first kernel in FIG. 2A and the second kernel in FIG. 3A stacked relative to each other according to the teachings of the present disclosure;

FIG. 4B is a plot of the transmission coefficients of x-polarized light versus $k_x$ and $k_y$ for a first frequency of a multi-frequency y-polarized light incident on the stacked first and second kernels in FIG. 4A;

FIG. 4C is a plot, for the first frequency of a multi-frequency y-polarized light incident on the stacked first and second kernels in FIG. 4A, of transmission coefficients versus $k_x$, absolute value of the complex part of the transmission coefficients ($|t_{yx}|$), and phase of the transmission coefficients values ($\arg(t_{yx})$) of x-polarized plane waves propagated through the stacked first and second kernels in FIG. 4A;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to a stacked (multi-level) multi-frequency 3D metasurface (also referred to herein simply as "stacked 3D metasurface") that simultaneously provides convolutions on at least two separate wavelengths of an incident multi-frequency polarized light. The stacked 3D metasurface includes a first kernel (unit cell) configured to provide a first convolution on a first wavelength of an incident multi-frequency polarized light and a second kernel stacked relative to the first kernel, the second kernel being configured to provide a second convolution on a second wavelength of the incident multi-frequency polarized light. As used herein, the term "stacked" and the phrase "stacked relative to" refer to at least two kernels aligned along a single axis of incident light such that the axis and the incident light propagate through both of the at least two kernels.

In some variations, the second kernel is the same as the first kernel (i.e., has the same structure), while in other variations the second kernel is different than the first kernel. And in at least one variation, the first kernel is mirror symmetric along a first plane and the second kernel is mirror symmetric along a second plane that is normal to the first plane. The first and second kernels can be disposed within a substrate that holds or positions the first and second kernels in a desired position and/or orientation relative to an outer surface of the substrate and/or an axis of incident light. And in some variations, the second convolution is the same as the first convolution, while in other variations the second convolution is different than the first convolution.

Figure 1A:
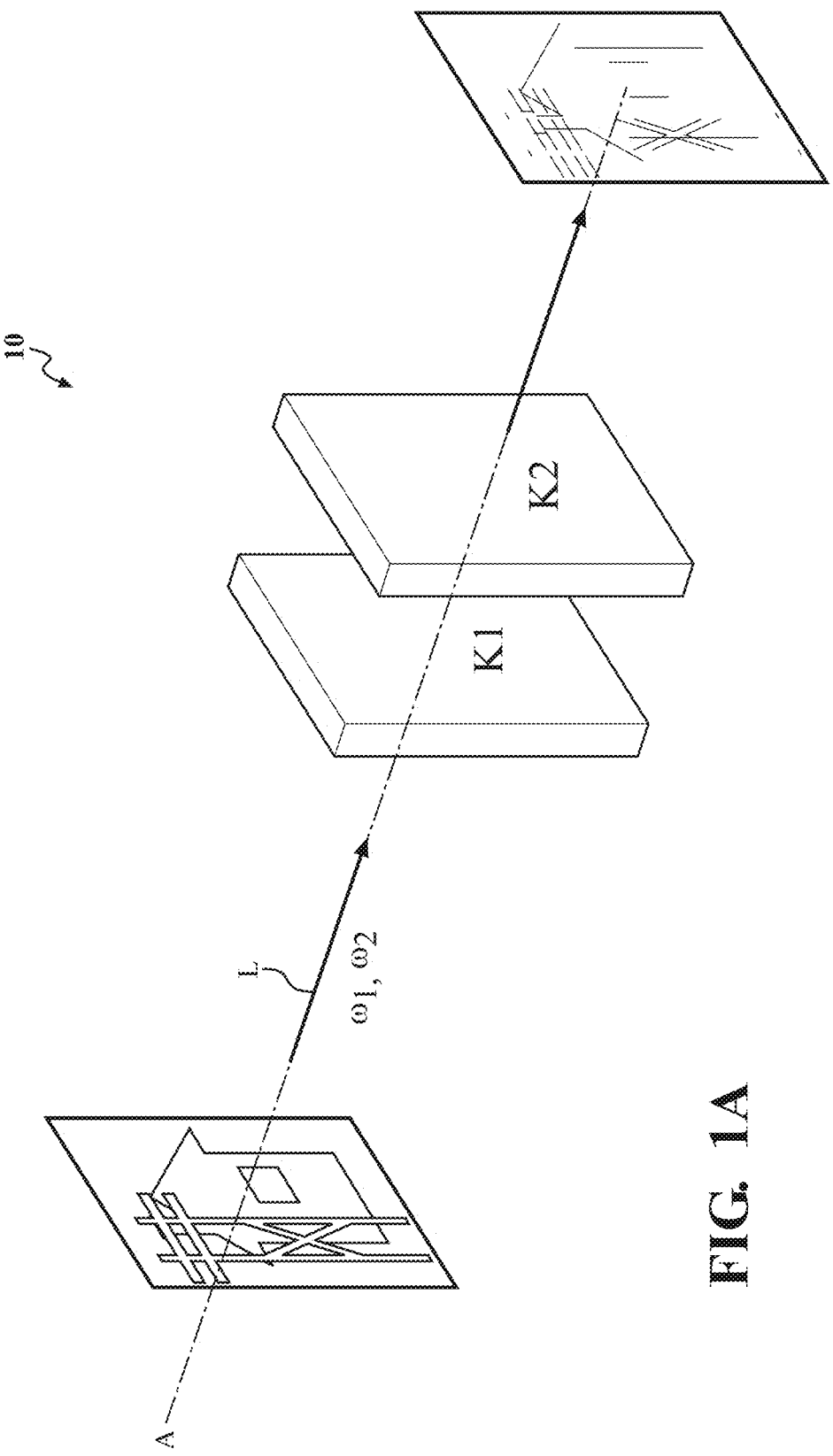
FIG. 1A is a perspective view of two kernels (also known as "unit cells") of a stacked multi-frequency 3D metasurface performing a convolution operation on two different light wavelengths according to the teachings of the present disclosure.
Figure 1B:
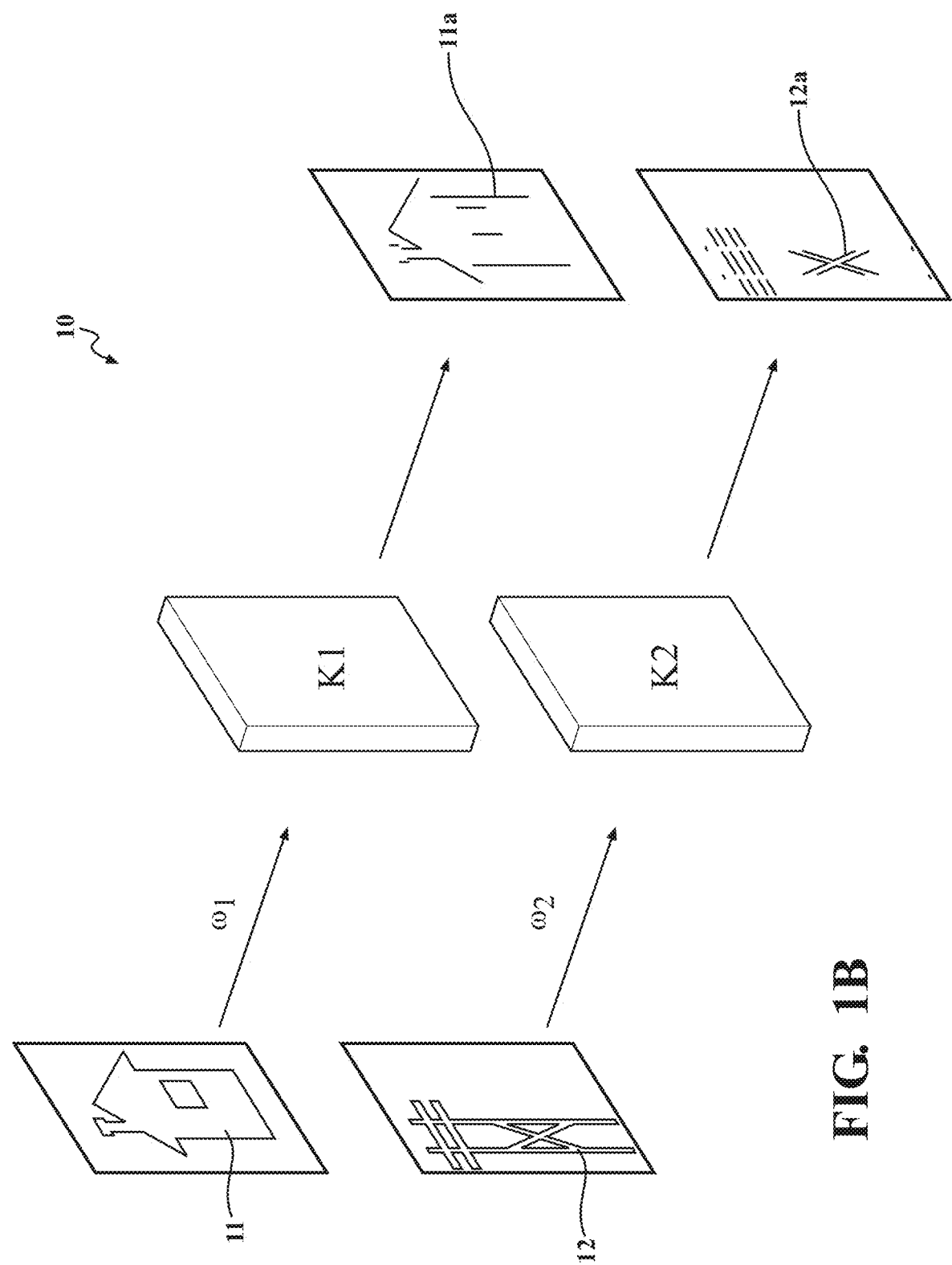
FIG. 1B is an exploded perspective view of the two kernels in FIG. 1B.

Referring now to FIGS. 1A and 1B, a perspective view of a stacked 3D metasurface 10 according to the teachings of the present disclosure is shown in FIG. 1A and a perspective exploded or separated view of the stacked 3D metasurface 10 is shown in FIG. 1B. The stacked 3D metasurface 10 includes a first layer with a first kernel 'K1' and a second layer with a second kernel 'K2' stacked along an axis 'A' of incident light 'L' as shown in FIG. 1A. The incident light L includes at least two different frequencies, i.e., a first frequency $\omega_1$ and a second frequency $\omega_2$ different than the first frequency $\omega_1$. In some variations, the first and second kernels K1, K2 are transparent to the incident light L, and in at least one variation the incident light L is polarized light with at least the first frequency $\omega_1$ and the second frequency $\omega_2$.

Referring particularly to FIG. 1B, the first kernel K1 and the second kernel K2 are illustrated separate from each other, i.e., not stacked, to more clearly illustrate the first kernel K1 being configured to provide a convolution of the first frequency $\omega_1$ and the second kernel K2 being configured to provide a convolution of the second frequency $\omega_2$. For example, the first frequency $\omega_1$ of the incident light L contains a first piece of information 11 (e.g., an image of a house) and the second frequency $\omega_2$ of the incident light L contains a second piece of information 12 (e.g., an image of an overhead power line tower). In addition, propagation of the incident light L through the first kernel K1 results in a convolution 11a (e.g., edge detection) on the first frequency $\omega_1$, but not a convolution on the second frequency $\omega_2$ as described in greater detail below. Similarly, propagation of the incident light L through the second kernel K2 results in a convolution 12a (e.g., non-vertical edges) on the second frequency $\omega_2$, but not a convolution on the first frequency $\omega_1$. Accordingly, the metasurface 10 provides simultaneous and independent convolutions on at least two different frequencies of incident light.

Referring to FIG. 2A-3C, one non-limiting example of a first kernel 110 and a second kernel 120 that provide independent convolutions for information contained in two separate frequencies of incident light are shown and discussed. Particularly, FIG. 2A shows a perspective view of the first kernel 110 with a width along the x-direction shown in the figure, a length along the y-direction, and a thickness along the z-direction. In addition, the first kernel 110 has one or more lattice holes or openings 112 extending through the thickness of the first kernel 110. In some variations, and as illustrated in FIG. 2A, the first kernel 110 is mirror symmetric along the x-direction, i.e., about the y-z plane 'YZ' shown in the figure. And in at least one variation, the one or more lattice holes 112 are rectangular shaped as shown in FIG. 2A and/or the first kernel 110 is transparent. It should be understood that the width, length and thickness of the first kernel 110, and/or the shape and dimensions of the one or more lattice holes 112 are designed, manufactured and configured to provide a desired convolution at a given frequency of incident light as discussed below. And in some variations, the width, length and thickness of the first kernel 110, and/or the dimensions of the one or more lattice holes 112 are subwavelength relative to incident light.

Referring particularly to FIGS. 2B-2C, FIG. 2B shows the dispersion relation between the wave vector $k_x$ and frequency $\omega$ for y-polarized light incident on the first kernel 110 along the z-axis, and thus shows the dispersion relation of the guided modes in the first kernel 110. And FIG. 2C shows the plot in FIG. 2B with the absolute value of the complex transmission coefficients ($|t_{yx}|$) for y-polarized light propagating through the first kernel 110 and with x-polarized out. As observed from FIGS. 2B-2C, polarization conversion occurs predominately at and/or near a resonance frequency of about 0.842, while frequencies not generally equal to 0.842 do not exhibit a polarization conversion when propagating through the first kernel 110.

Referring now to FIG. 3A, a perspective view of the second kernel 120 with a width along the x-direction shown in the figure, a length along the y-direction, and a thickness along the z-direction. In addition, the second kernel 120 has one or more lattice holes or openings 122 extending through the thickness of the second kernel 120. In some variations, and as illustrated in FIG. 3A, the second kernel 120 is mirror symmetric along the y-direction, i.e., about the x-z plane 'XZ' shown in the figure. And in at least one variation, the one or more lattice holes 122 are rectangular shaped as shown in FIG. 3A and/or the second kernel 120 is transparent. In some variations, the width, length and thickness of the second kernel 120, and/or the shape and dimensions of the one or more lattice holes 122 are generally the same as for the first kernel 110 and the second kernel 120 is simply positioned or oriented at a different angle (e.g., 90 degrees) relative to the first kernel 110 and/or the axis A of incident light. In other variations, the width, length and/or thickness of the second kernel 120, and/or the shape and dimensions of the one or more lattice holes 122 are generally not the same as for the first kernel 110. And in such variations, the second kernel 120 may or may not be positioned or oriented at a different angle relative to the first kernel 110 and/or the axis A of incident light. Also, it should be understood that the width, length and thickness of the second kernel 120, and/or the shape and dimensions of the one or more lattice holes 122 are designed, manufactured and configured to provide a desired convolution at a given frequency of incident light as discussed below. And in some variations, the width, length and thickness of the second kernel 120, and/or the dimensions of the one or more lattice holes 122 are subwavelength relative to incident light.

Referring to FIGS. 3B-3C, FIG. 3B shows the dispersion relation between the wave vector $k_y$ and frequency $\omega$ for y-polarized light incident on the second kernel 120 along the z-axis, and thus shows the dispersion relation of the guided modes in the second kernel 120. And FIG. 3C shows the plot in FIG. 2B with the absolute value of the complex transmission coefficients ($|t_{yx}|$) for y-polarized light propagating through the second kernel 120 and with x-polarized out. As observed from FIGS. 3B-3C, polarization conversion occurs predominately at and/or near a resonance frequency of 0.824, while frequencies not generally equal to 0.824 do not exhibit a polarization conversion when propagating through the second kernel 120.

It should be understood from FIGS. 2A-3C, that the first kernel 110 has a first resonance mode at a first frequency (i.e., a first resonance frequency) of about 0.842 and the second kernel 120 has a second resonance mode at a second frequency (i.e., a second resonance frequency) of about 0.824. In addition, the second kernel 120 does not have a resonance mode at or near the first resonance frequency of the first kernel 110, and the first kernel 110 does not have a resonance mode at or near the second resonance frequency of the second kernel 120. Stated differently, there is no coupling between resonances from the first kernel 110 and the second kernel 120, and each kernel is configured to independently perform its own functionality or convolution on incident light waves.

Figure 4D:
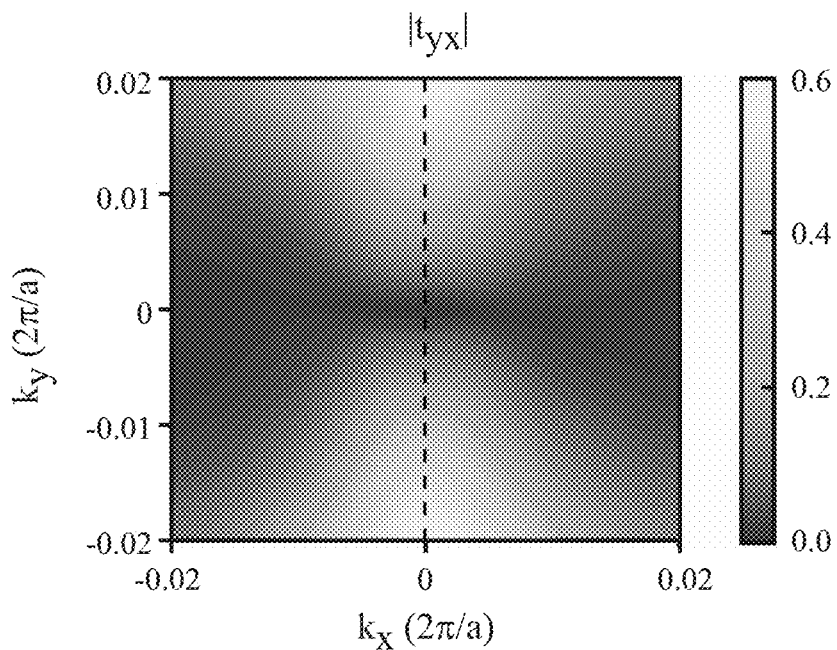
FIG. 4D is a plot of the transmission coefficients of x-polarized light versus $k_x$ and $k_y$ for a second frequency of a multi-frequency y-polarized light incident on the stacked first and second kernels in FIG. 4A.

Referring now to FIGS. 4A-4E, FIG. 4A illustrates a stacked 3D metasurface 20 with the first kernel 110 in FIG. 2A and the second kernel 120 in FIG. 3A stacked relative to each other in the z-direction, and spaced apart from each other by a distance '4:1'. In some variations the distance d is zero, while in other variations the distance d is greater than zero. Also, y-polarized light 'Ly' aligned with the z-axis is incident on the stacked 3D metasurface 20. In some variations, an x-polarization filter is provided below (−z direction) the stacked 3D metasurface 20 such that x-polarized light is provided as output. FIG. 4B shows a plot of the wave vectors $k_y$, $k_x$, and the absolute value of the complex transmission coefficients ($|t_{yx}|$) for the first resonance frequency 0.842 of y-polarized light $L_y$ propagating through the first and second kernels 110, 120. And FIG. 4C shows a line cut of the transmission coefficients $t_{yx}$ versus $k_x$ at $k_y$=0, at frequency 0.842. The solid line shows the absolute value of the transmission coefficients ($|t_{yx}|$), and the dashed line shows the phase of the transmission coefficients ($\arg(t_{yx})$).

Figure 4E:
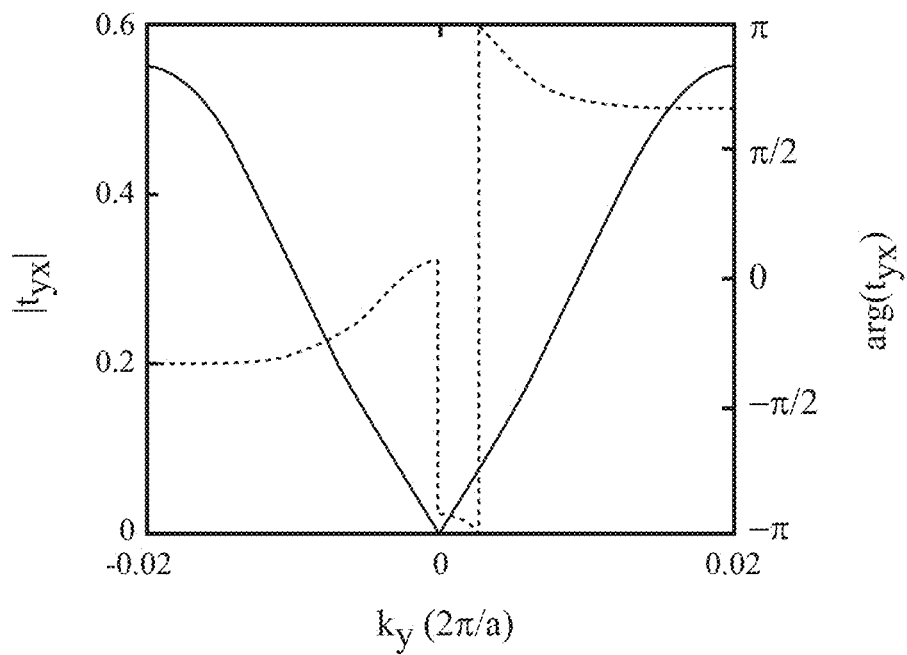
FIG. 4E is a plot, for the second frequency of the multi-frequency y-polarized light incident on the stacked first and second kernels in FIG. 4A, of transmission coefficients versus $k_y$, absolute value of the complex part of the transmission coefficients ($|t_{yx}|$), and phase of the transmission coefficients values ($\arg(t_{yx})$) of x-polarized plane waves propagated through the stacked first and second kernels in FIG. 4A.

Referring particularly to FIG. 4D, a plot of the wave vector $k_y$ as a function of the wave vector $k_x$ and the absolute value of the complex transmission coefficients ($|t_{yx}|$) for the second resonance frequency 0.824 of the y-polarized light $L_y$ propagating through the first and second kernels 110, 120 is shown. And FIG. 4E shows a line cut of the transmission coefficients $t_{yx}$ versus $k_y$ at $k_x$=0, at frequency 0.824. The solid line shows the absolute value of the transmission coefficients ($|t_{yx}|$), and the dashed line shows the phase of the transmission coefficients ($\arg(t_{yx})$).

As observed from a comparison of the FIGS. 4B and 4D, the stacked 3D metasurface 20 performs a first convolution of the y-polarized light $L_y$ at the first resonance frequency 0.842 and a second convolution (different than the first convolution) of the y-polarized light Ly at the second resonance frequency 0.824. In addition, there is no coupling between resonances from the first kernel 110 and the second kernel 120, and each kernel is configured to independently perform its own functionality or convolution on incident light waves.

While FIGS. 2A-4D illustrate mirror symmetric kernels and first order convolutions (e.g., $\partial_x$, $\partial_y$) of incident polarized light, it should be understood that kernels having other geometric and/or convolution functionalities are included in the teachings of the present disclose. For example, the teachings of the present disclosure provide stacked 3D metasurfaces with stacked kernels that have non-symmetrical geometric structures, so long as the stack kernels include a first kernel with a resonance mode at a first resonance frequency, a second kernel with a resonance mode at a second resonance frequency different than the first resonance frequency, and there is no coupling between the resonance modes at the first and second frequencies such that each kernel performs its own functionality on an incident multi-frequency polarized light. In addition, the teachings of the present disclosure provide for other than first order convolutions such as second order convolutions and combinations of first order convolutions and second order convolutions, among others.

Figure 5A:
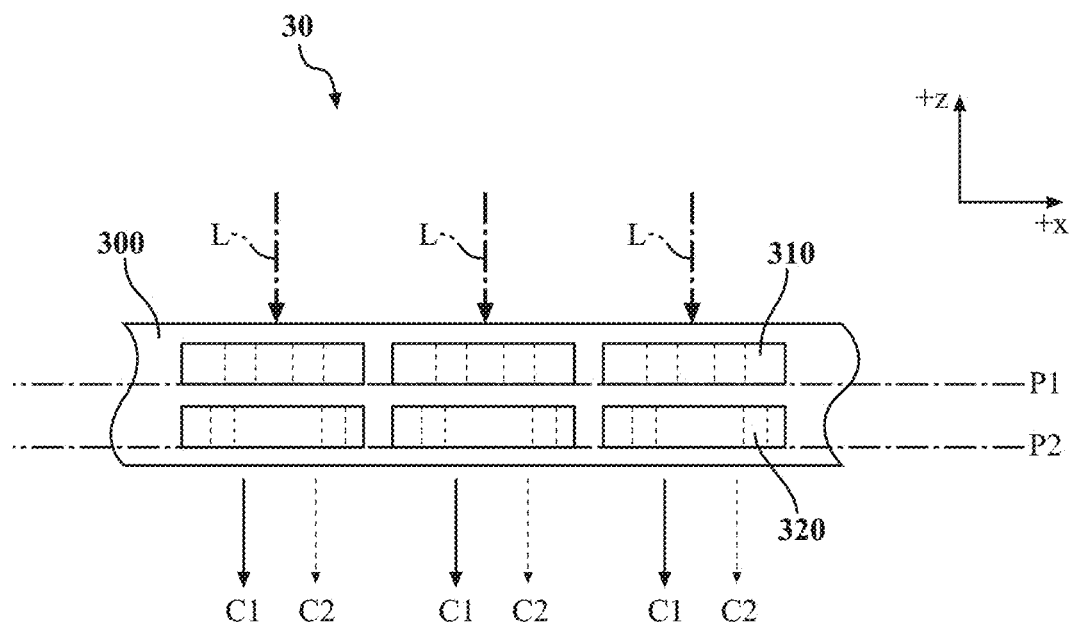
FIG. 5A is a side view of a stacked multi-frequency 3D metasurface with stacked first and second kernels according to the teachings of the present disclosure.
Figure 5B:
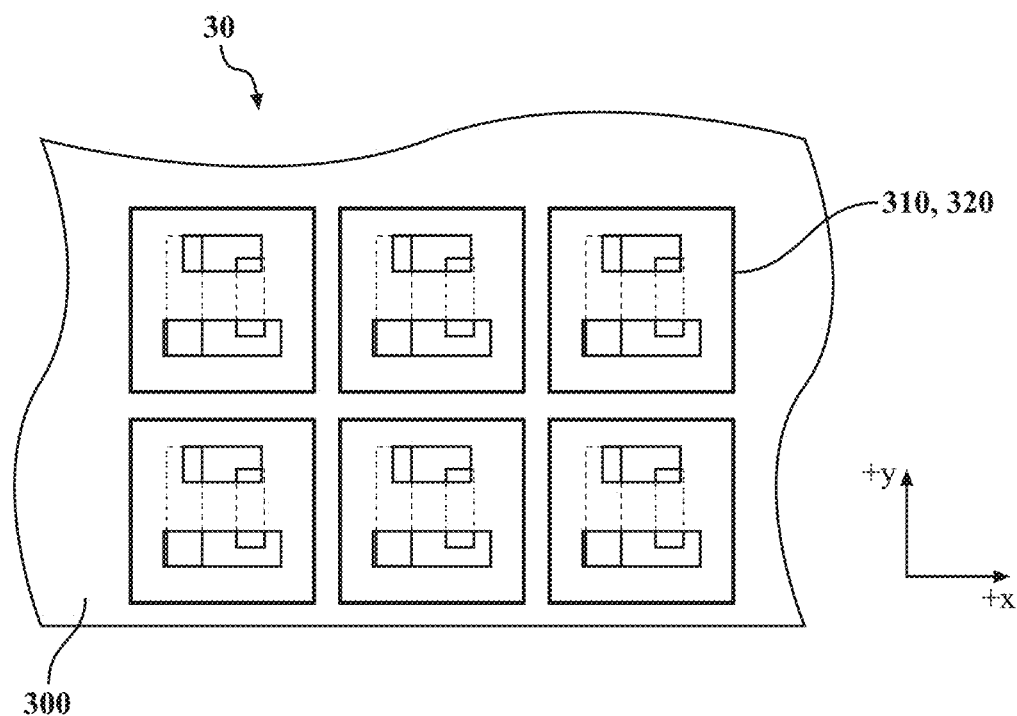
FIG. 5B is a top view of the stacked multi-frequency 3D metasurface in FIG. 5A.

Referring now to FIGS. 5A and 5B, a side view of a stacked 3D metasurface 30 is shown in FIG. 5A and a top view of the stacked 3D metasurface 30 is shown in FIG. 5B. The stacked 3D metasurface 30 includes a substrate 300, a plurality of first kernels 310 disposed on and parallel to a first x-y plane 'P1' (also referred to herein simply as a "first plane P1"), and a plurality of second kernels 330 disposed on and parallel to a second x-y plane 'P2' that is different than, and parallel to the first plane P1 as shown in FIG. 5A. And while the plurality of first kernels 310 are shown spaced apart in the z-direction from the plurality of second kernels 320, in some variations the distance between the plurality of first kernels 310 and the plurality of second kernels 320 is zero. The plurality of first kernels 310 and the plurality of second kernels 320 are stacked relative to each other in a direction normal to the first plane P1 such that light 'L' incident on the stacked 3D metasurface 30 is incident on and propagates through the plurality of first kernels 310 and the plurality of second kernels 320. However, in some variations at least a portion of the plurality of first kernels 310 and at least a portion of the second kernels 320 are not aligned with each other, i.e., one of the layers of the kernels is translated in the xy-plane relative to the other layer. Also, the plurality of first kernels 310 provide a first convolution 'C1' on a first frequency of the incident light L and the plurality of second kernels provide a second convolution 'C2' on a second frequency of the incident light L.

Non-limiting examples of materials from which the substrate 300 is formed include silica, sapphire, and polymers, among others, and non-limiting examples of materials from which the first and second kernels 310, 320 are formed include silicon, $TiO_2$, and GaAs, among others. Also, it should be understood that the stacked 3D metasurface 30 is designed, manufactured, and configured with a resonance mode at a first resonance frequency, a resonance mode at a second resonance frequency different than the first resonance frequency, and no coupling between the resonance modes at the first and second frequencies.

Figure 6:
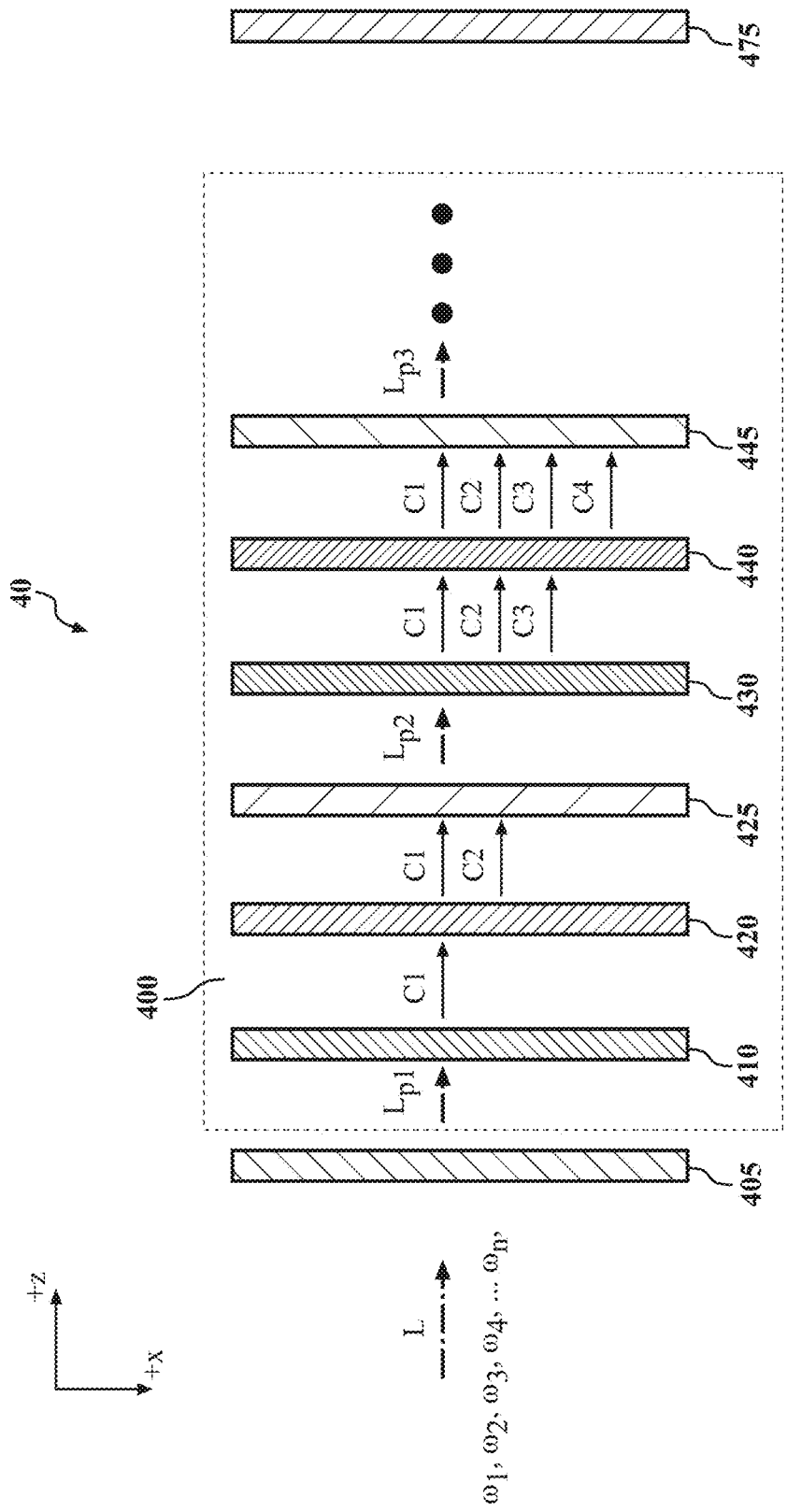
FIG. 6 is a side view of another stacked multi-frequency 3D metasurface with stacked first and second kernels according to the teachings of the present disclosure.

Referring to FIG. 6, a side view of stacked 3D metasurface 40 configured for multiplexing more than two different frequencies is shown. The stack 3D metasurface 40 includes at least a first kernel 410, a second kernel 420, a third kernel 430, and a fourth kernel 440 (collectively referred to herein as "kernels 410-440"). In some variations, the kernels 410-440 are disposed and securely positioned within a substrate 400. A polarizer 405, for example a y-polarization filter, is positioned before (−z direction) the first kernel 410 and may or may not be part of the stacked 3D metasurface 40. That is, in some variations the polarizer 405 is attached to a surface of and/or disposed within the substrate 400 such that polarizer 405 is included with the stacked 3D metasurface 40, while in other variations the polarizer 405 is provided separately from the stacked 3D metasurface 40. However, in both variations the polarizer 405 polarizes (e.g., y-plane polarization) incident multi-frequency light 'L' to provide multi-frequency polarized light '$L_{p1}$' to the first kernel 410.

As discussed above, the first kernel 410 provides a first convolution 'C1' on a first frequency $\omega_1$ of the polarized light $L_{p1}$ and the second kernel 420 provides a second convolution 'C2' on a second frequency $\omega_2$ of the polarized light $L_{p1}$. In addition, a polarization rotation layer 425 is included such that the polarized light $L_{p1}$ is polarized to '$L_{p2}$' which allows for the third kernel 430 to provide a third convolution 'C3' on a third frequency ω3 of the polarized light $L_{p2}$ and the fourth kernel 440 to provide a fourth convolution 'C4' on a fourth frequency $\omega_4$ of the polarized light $L_{p2}$. Accordingly, the kernels 410-440 with the polarizer 405 and the polarization rotation layer 425 provide for four independent convolutions of the light L.

In some variations, the stacked 3D metasurface 40 can include another polarization rotation layer 445 such that the polarized light $L_{p2}$ is polarized to $L_{p3}$, which in turn allows for additional kernels to be added or included to the stacked 3D metasurface 40 such that additional independent convolutions are performed on additional different frequencies of the light L. In addition, the polarization rotation layer 445 can be an inverse polarization rotation layer with respect to polarization rotation layer 425 such that the polarized light $L_{p2}$ is polarized back to $L_{p1}$.

In at least one variation, another polarizer 475, for example an x-polarization filter, is positioned after (+z direction) the last kernel (+z direction) of the stacked 3D metasurface 40 to ensure a desired polarization (e.g., x-plane polarization) of the light L is provided. In some variations the polarizer 475 is attached to a surface of and/or disposed within the substrate 400 such that polarizer 475 is included with the stacked 3D metasurface 40, while in other variations the polarizer 475 is provided separately from the stacked 3D metasurface 40. And while FIG. 6 illustrates the polarizers 405, 425, 445, 475 and the kernels 410-440 spaced apart from each other along the z-direction, it should be understood that in some variations one or more of the kernels 410-440 are not spaced apart from an adjacent kernel or adjacent kernels and/or one or more of the polarizers 405, 425, 445, 475.

The foregoing description is merely illustrative in nature and is no way intended to limit the disclosure, its application, or uses. Also, work of the presently named inventors, to the extent it may be described in this background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may", and their variants, are intended to be non-limiting, such that recitation that an embodiment can or may comprise certain elements or features does not exclude other embodiments of the present technology that do not contain those elements or features.

As used herein the terms "about" and "generally" when related to dimensions and/or numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A metasurface comprising:
a multi-level three-dimensional metasurface comprising:
a first layer comprising a first kernel configured to apply a first convolution on a first frequency of an incident polarized light, the first convolution being a first order differentiation on the first frequency; and
a second layer comprising a second kernel different than the first kernel, the second kernel configured to apply a second convolution different than the first convolution on a second frequency different of the incident polarized light, the second convolution being another first order differentiation on the second frequency, and the second frequency being different than the first frequency.

2. The metasurface according to claim 1, wherein the first kernel is disposed on and parallel to a first plane, and the second kernel is disposed on and parallel to a second plane that is different than, and parallel to, the first plane.

3. The metasurface according to claim 2, wherein the first kernel and the second kernel are stacked relative to each other in a direction normal to the first plane.

4. The metasurface according to claim 1, wherein the first kernel is mirror symmetric along a first direction and the second kernel is mirror symmetric along a second direction different than the first direction.

5. The metasurface according to claim 4, wherein the second direction is perpendicular to the first direction.

6. The metasurface according to claim 1, wherein the first kernel is transparent to the incident polarized light.

7. The metasurface according to claim 1, wherein the second kernel is transparent to the incident polarized light.

8. The metasurface according to claim 1, wherein the first kernel and the second kernel are transparent to the incident polarized light.

9. The metasurface according to claim 8 further comprising a substrate, wherein the first kernel and the second kernel are disposed in the substrate.

10. The metasurface according to claim 1 further comprising:
a third layer comprising a third kernel disposed on and parallel to a third plane, the third kernel configured to apply a third convolution on a third frequency of the incident polarized light;
a fourth layer comprising a fourth kernel disposed on and parallel to a fourth plane, the fourth kernel configured to apply a fourth convolution different than the third convolution on a fourth frequency different than the third frequency of the incident polarized light; and
a polarization rotation layer disposed between the second kernel and the third kernel.

11. The metasurface according to claim 10, wherein the first kernel, the second kernel, the third kernel, and the fourth kernel are stacked relative to each in a direction normal to the third plane.

12. The metasurface according to claim 11, wherein the first and third kernels are mirror symmetric along a first direction and the second and fourth kernels are mirror symmetric along a second direction different than the first direction.

13. The metasurface according to claim 12, wherein the second direction is perpendicular to the first direction.

14. A metasurface comprising:
a multi-level three-dimensional metasurface comprising:
a first layer disposed on and parallel to a first plane and comprising a first kernel configured to apply a first convolution on a first frequency of an incident polarized light, the first convolution being a first order differentiation on the first frequency; and
a second layer disposed on and parallel to a second plane that is parallel to and different from the first plane such that the second layer is stacked on the first layer, the second layer comprising a second kernel different than the first kernel and configured to apply a second convolution different than the first convolution on a second frequency different than the first frequency of the incident polarized light, the second convolution being another first order differentiation on the second frequency.

15. The metasurface according to claim 14 further comprising a substrate, wherein the first kernel and the second kernel are disposed in the substrate.

16. The metasurface according to claim 15, wherein the first kernel is mirror symmetric along a first direction and the second kernel is mirror symmetric along a second direction perpendicular to the first direction.

17. The metasurface according to claim 16, wherein the another first order differentiation is different than the first order differentiation.

18. A metasurface comprising:
a multi-level three-dimensional metasurface comprising:
a first layer disposed on and parallel to a first plane and comprising a first kernel configured to apply a first convolution on a first frequency of an incident polarized light; and
a second layer disposed on and parallel to a second plane that is parallel to and different from the first plane such that the second layer is stacked on the first layer, the second layer comprising a second kernel different than the first kernel and configured to apply a second convolution different than the first convolution on a second frequency different than the first frequency of the incident polarized light, wherein:
the first kernel is mirror symmetric along a first direction;
the second kernel is mirror symmetric along a second direction perpendicular to the first direction;
the first convolution is a first order differentiation of the first frequency of the incident polarized light; and the
second convolution is another first order differentiation of the second frequency of the incident polarized light.

19. The metasurface according to claim 18, wherein the first kernel and the second kernel are transparent to the incident polarized light.

20. The metasurface according to claim 18 further comprising a substrate, wherein the first kernel and the second kernel are disposed in the substrate.